United States Patent [19]

Burkett

[11] 4,158,527

[45] Jun. 19, 1979

[54] ADJUSTABLE SPEED DRIVE SYSTEM FOR CENTRIFUGAL FAN

[75] Inventor: Jerry D. Burkett, Hopewell Junction, N.Y.

[73] Assignee: EcoLaire Incorporated, Malvern, Pa.

[21] Appl. No.: 725,901

[22] Filed: Oct. 22, 1976

Related U.S. Application Data

[62] Division of Ser. No. 718,303, Aug. 26, 1976.

[51] Int. Cl.² .................. F04B 49/06; F01D 4/00
[52] U.S. Cl. ........................................ 417/18; 417/53; 415/1
[58] Field of Search ................ 415/1; 417/18, 6, 22, 417/42, 47, 53; 318/237

[56] References Cited

U.S. PATENT DOCUMENTS

| | | | |
|---|---|---|---|
| 1,401,668 | 12/1921 | Brown et al. | 417/26 |
| 2,339,150 | 1/1944 | Codrington | 417/146 |
| 2,478,423 | 8/1949 | Ponomareff et al. | 415/17 |
| 3,068,796 | 12/1962 | Pfluger | 417/26 |
| 3,151,199 | 9/1964 | Flynn et al. | 417/6 |
| 3,205,279 | 9/1965 | Pratt et al. | 417/295 |
| 3,276,674 | 10/1966 | Hens | 415/1 |
| 3,292,846 | 12/1966 | Harper | 415/1 |
| 3,332,621 | 7/1967 | Tanner | 417/2 |
| 3,362,626 | 1/1968 | Schlirf | 417/47 |
| 3,363,829 | 1/1968 | Chen | 417/3 |
| 3,384,022 | 5/1968 | Oshima | 415/143 |
| 3,411,702 | 11/1968 | Metot | 415/1 |
| 3,493,167 | 2/1970 | Akerhielm et al. | 417/22 |
| 3,526,816 | 9/1970 | Paice et al. | 318/237 |
| 3,699,416 | 10/1972 | Everett | 318/237 |
| 3,732,034 | 5/1973 | Reid | 417/6 |
| 3,778,695 | 12/1973 | Bauer | 417/45 |
| 3,887,852 | 6/1975 | Fernandes | 318/237 |
| 3,963,367 | 6/1976 | Stalker | 417/42 |

FOREIGN PATENT DOCUMENTS 871083  6/1961  United Kingdom ................ 417/47

OTHER PUBLICATIONS

Adjustable-Speed Pumps for Utilities, published by Journal of American Water Works Assoc., authors Adam Kubik et al., Feb. 1961.
Adjusting Pump Arm for Flow Regulation, published by Control Engineering (Oct. 1962), author W. G. Holtzbuch.
Centrifugal Pumps as Final Control Elements, published by Instrumentation Technology (Dec. 1972), author R. E. Wendt et al.

Primary Examiner—William L. Freeh
Attorney, Agent, or Firm—Seidel, Gonda, Goldhammer, & Panitch

[57] ABSTRACT

A centrifugal fan provided with dampers is driven by a motor having a speed control circuit. Air flow from the centrifugal fan is controlled from a point of maximum air flow to a predetermined crossover speed only by changing the velocity of the fan impeller with subsequent air flow control at air flow rates below said crossover speed being attained only by adjustment of the fan dampers.

7 Claims, 10 Drawing Figures

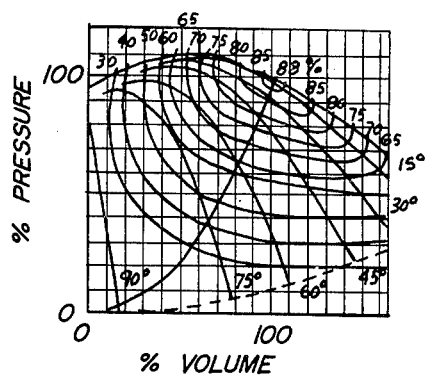
FIG. 1 PRIOR ART
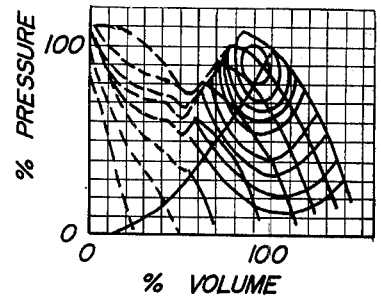
FIG. 2 PRIOR ART
FIG. 3
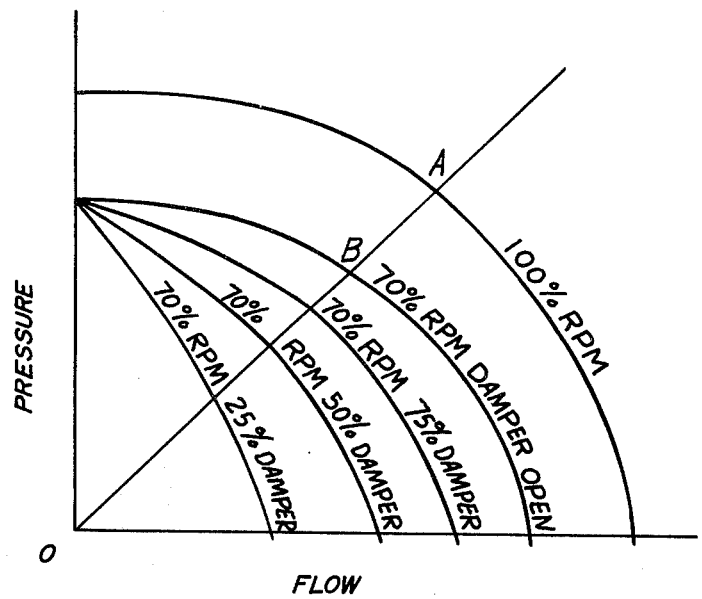
FIG. 4
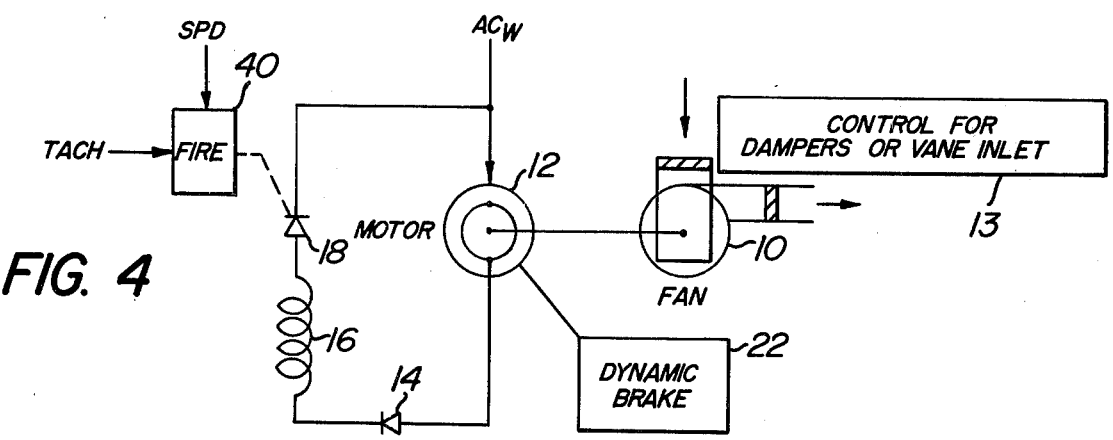

4,158,527

ADJUSTABLE SPEED DRIVE SYSTEM FOR CENTRIFUGAL FAN

RELATED CASE

This application is a division of my copending application Ser. No. 718,303, filed Aug. 26, 1976 and entitled Centrifugal Fan Air Control System.

BACKGROUND

Centrifugal fans are well known to those skilled in the art. The use of a centrifugal fan by utility companies in connection with supply of air to boilers is not effectively competitive with axial flow fans. While a centrifugal fan has a higher efficiency at the maximum boiler load, the efficiency falls off drastically, as compared with an axial flow fan, due to the fact that flow control with a centrifugal fan is attained by adjustment of dampers. In an axial flow fan, adjustment of load is attained by varying the pitch of blades. In a typical installation, with each of a centrifugal fan and an axial fan operating at 75% boiler load, the efficiency of the centrifugal fan would be approximately 80%.

The present invention is directed to apparatus and method for enabling a centrifugal fan having dampers to operate at a higher efficiency as compared with an axial fan having variable pitch blades.

SUMMARY OF THE INVENTION

In practicing the method of the present invention, air flow is controlled by providing a centrifugal fan having a fan impeller and dampers, and driving the impeller by a motor speed control. Control of air flow is attained in two different ways depending upon whether the air flow is above or below a predetermined crossover point. When air flow is above the predetermined crossover point, air flow is controlled only by changing the velocity of the fan impeller. When air flow is below the crossover point, air flow is controlled only by adjustment of the dampers.

It is an object of the present invention to provide a centrifugal fan control system whereby the efficiency of the centrifugal fan will exceed the efficiency of a comparable axial flow fan.

It is an object of the present invention to increase the efficiency of a centrifugal fan by using two different ways of varying air flow depending upon whether air flow at any given time is above or below a predetermined crossover point.

It is an object of the present invention to substantially increase the efficiency of a centrifugal fan air flow system in a manner which is simple, inexpensive and reliable while providing for load management, multiple fans in the system, system upset, etc.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a graph of pressure versus air flow volume for a conventional prior art centrifugal fan with inlet vane control.

FIG. 2 is a graph similar to FIG. 1 but for a conventional axial flow fan with variable pitch blades.

FIG. 3 is a graph of pressure versus speed for the system of the present invention.

FIG. 4 is a diagrammatic simplified circuit for controlling slip losses of the centrifugal fan drive motor in accordance with the present invention.

Figure 5:
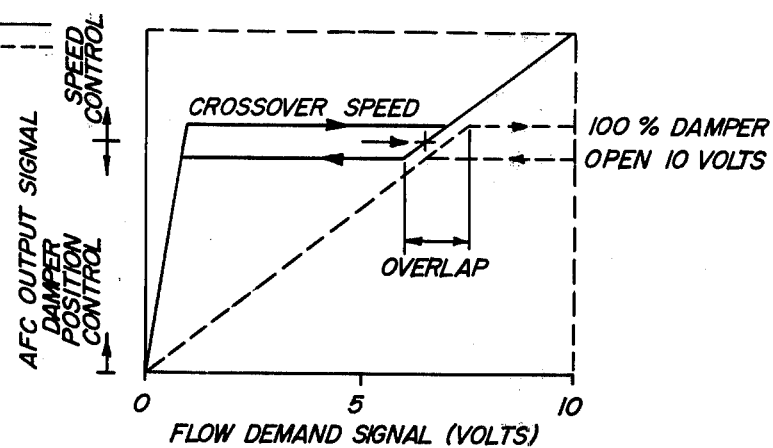
FIG. 5 is a graph of speed versus flow.

Referring to the drawings in detail, wherein like numerals indicate like elements, there is shown in FIG. 1 a typical pressure versus volume graph for a conventional centrifugal fan with inlet vane control. A similar graph for an axial fan with variable pitch blades is shown in FIG. 2. The major difference between the two types of fans is that the efficiency curves for a centrifugal fan are perpendicular to the system resistance line while those for an axial fan are almost parallel to the system resistance line. As a result thereof, at a typical boiler load of approximately 75%, the efficiency of a centrifugal fan system is approximately 45% while the efficiency of an axial fan system is approximately 80%. Hence, an axial flow fan is well known to be more efficient than a centrifugal flow fan except at maximum air flow volumes where the centrifugal fan is more efficient.

As shown in FIG. 4, the fan 10 is provided with a drive motor 12. The motor 12 is driven by an alternating current supply and may be a wound rotor type motor with an external speed control of conventional design. Although a multiple phase winding system is typically employed, for the purpose of simplicity only a single phase is shown in FIG. 4. Thus, the rotor of motor 12 is connected through a rectifier 14 to a high inductance coil or choke 16. The choke 16 smooths out the current. The coil 16 is connected to a silicon control rectifier 18 which is also known as a SCR. The SCR 18 is fired by fire control circuit 40 to convert the rectified rotor energy to alternating current which is then coupled to the power supply side of the motor 12. Hence, rotor slip losses are converted into primary power for the motor 12 thereby substantially increasing its efficiency.

LOAD MANAGEMENT

When the fan 10 is provided with the circuitry illustrated in FIG. 4, it is now possible to change the efficiency curve of a centrifugal fan. In FIG. 3, there is illustrated a pressure versus flow curve for a centrifugal fan in accordance with the present invention. The operating portion of the graph in FIG. 3 with respect to a centrifugal fan of the present invention is designated as 0-A. Maximum flow occurs at point A wherein the fan impeller is operating at 100% of speed. If it is desired to decrease the flow output of the fan 10 from point A, to a figure which is between point A and a crossover point designated as B, such change in air flow output is attained only by changing the velocity of the fan impeller which does not affect the efficiency of the fan. For purposes of illustrating the invention, the crossover point is designated as being 70% of fan speed with the damper fully open. Between points A and B, the dampers are fully open. At air flow rates below point B, change of flow is attained only by adjusting the dampers from a fully open position to a fully closed position while fan speed remains constant at said crossover point speed.

The above discussion with respect to crossover speed is diagrammatically illustrated in FIG. 5. As shown in FIG. 5, the crossover point B may actually be a range with initiation of the change being based on air flow which has been converted to a signal having a value between 0 and 10 volts. The use of a crossover range avoids hunting or instability.

Figure 6:
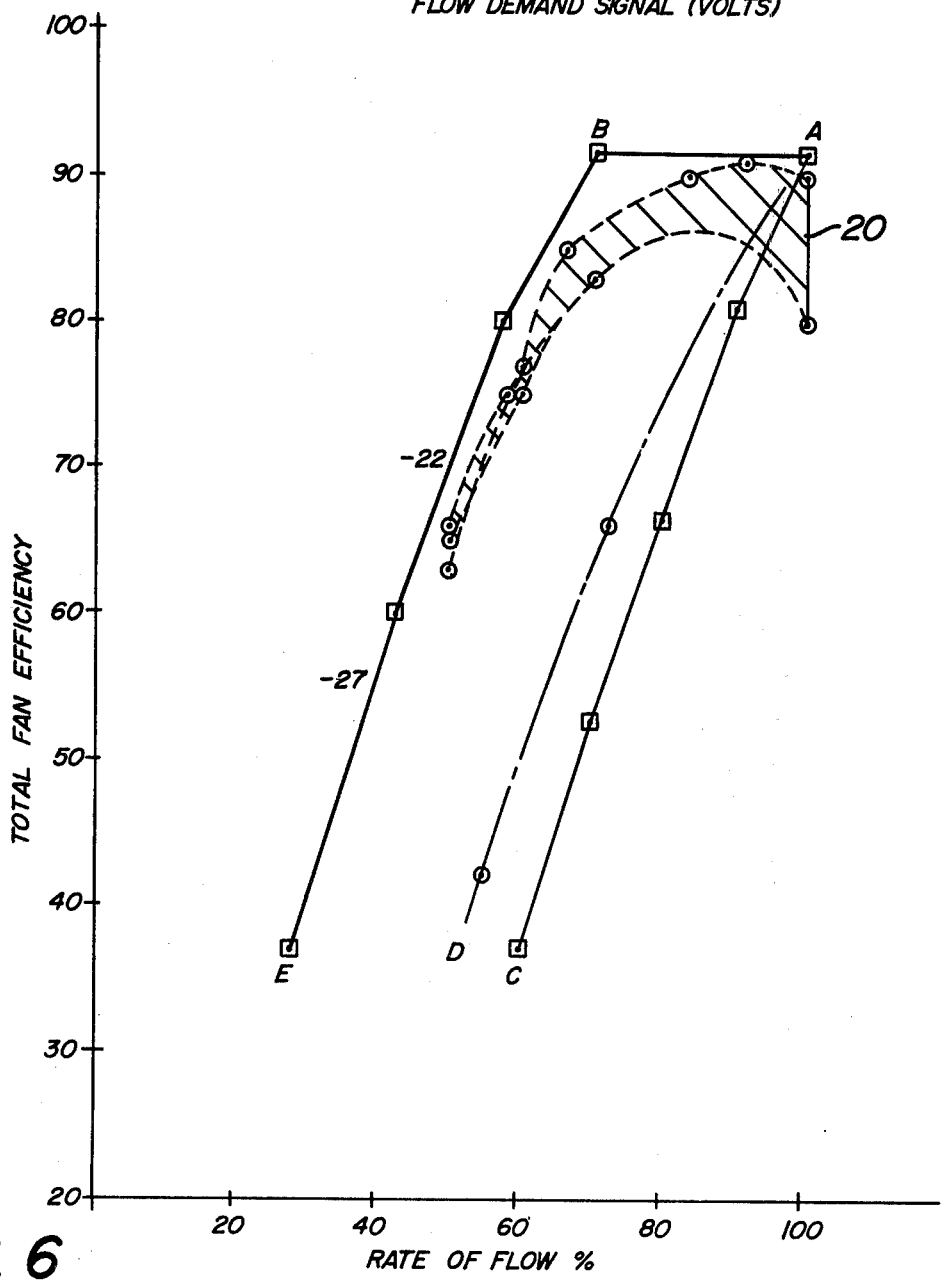
FIG. 6 is a comparative graph of a fan system in accordance with the present invention as compared with axial flow fans in terms of total fan efficiency versus rate of flow.

In FIG. 6, there is illustrated a graph of total fan efficiency versus rate of flow for the centrifugal fan of the present invention as compared with commercially available axial flow fans. In FIG. 6, commercially available axial flow fans have an efficiency versus rate of flow which falls within the hatched zone 20. As shown in FIG. 6, a conventional centrifugal fan has an efficiency versus rate of flow defined by the line A-C where rate of flow is controlled only by adjusting the outlet dampers and is defined by the line A-D where rate of flow is adjusted by varying the inlet dampers. As shown in FIG. 6, efficiency remains constant when rate of flow in accordance with the present invention between points A and B is attained only by adjustment of the speed of the fan 10. Below the crossover point B, the efficiency versus rate of flow is defined by the line B-E. Along the line B-E, rate of flow is varied only by changing the position of the dampers. It will be noted that at any particular rate of flow in FIG. 6 the efficiency of the fan 10 of the present invention as defined by the line ABE is greater than the efficiency for an axial flow fan as defined by the hatched zone 20.

Adjustment of dampers is accomplished by a flow demand signal from the boiler or other process associated with the present invention in the same manner as was accomplished heretofore. However, in accordance with the present invention, a logic system is interposed between the demand signal and the fan 10 to decide whether adjustment should be by speed control or by damper control. Thus, the logic system first determines whether the fan 10 is operating at a rate of flow which is above or below the crossover point B. If the rate of flow is above point B, the logic system modulates the demand signal to attain the desired change solely by varying the speed of the fan 10. If the then existing rate of flow is below point B, the logic system modulates the demand signal to attain the desired rate of flow by damper adjustment while fan speed remains at the speed corresponding to the crossover point.

Figure 8:
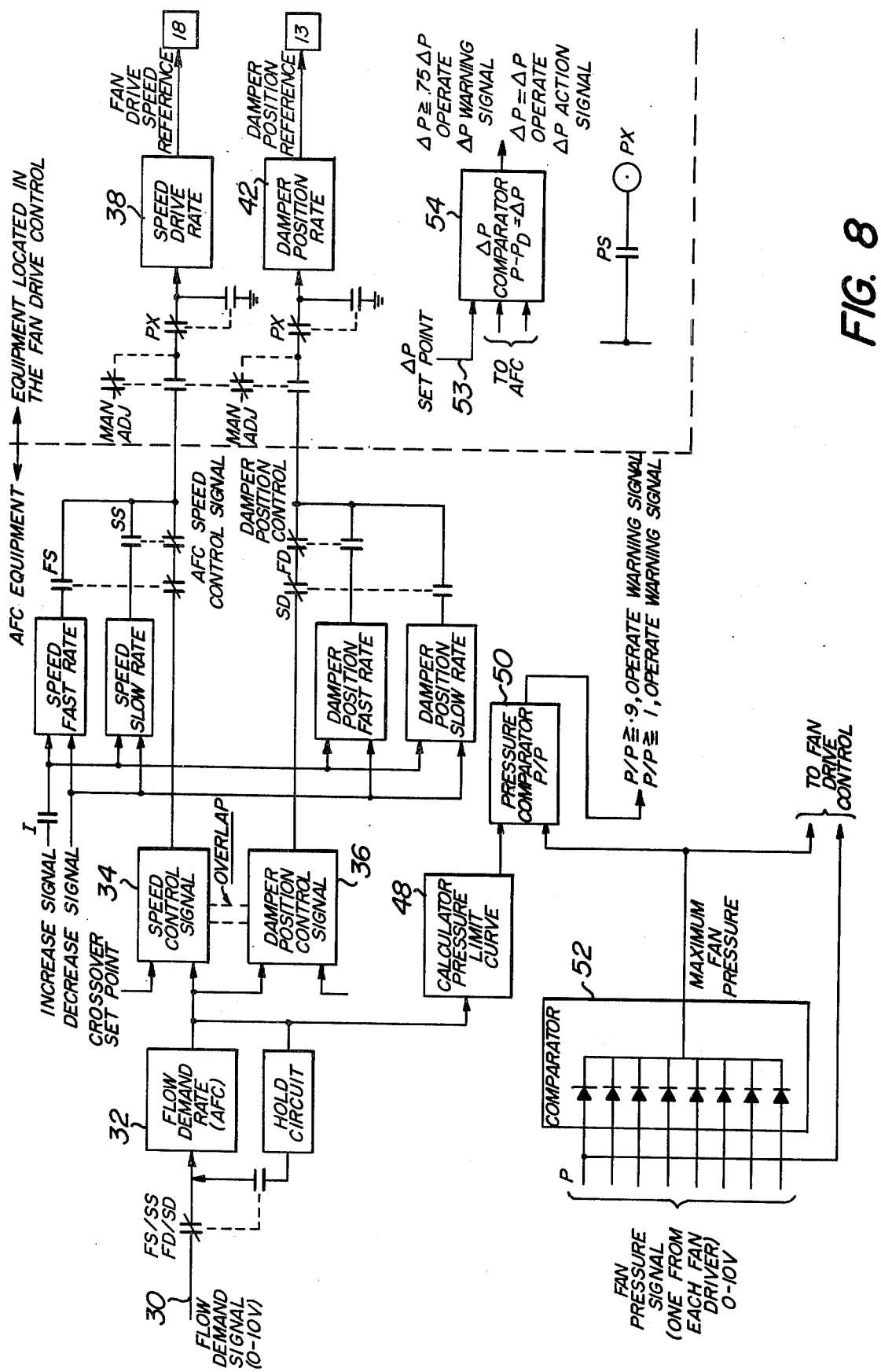
FIG. 8 is a schematic conrol diagram.

Referring to the schematic diagram in FIG. 8, it will be noted that the diagram includes the AFC (automatic fan controller) equipment segregated from the equipment located in the fan drive control. A flow demand signal 30 is coupled by normally closed contacts to a controller 32 which converts the voltage signal to a signal representative of flow demand rate. The flow demand rate is coupled to a comparator 34 which compares the flow demand rate signal with a crossover set point signal. Comparator 34 generates an output signal which is designated as AFC speed control signal, which in turn is coupled to a rate controller 38. The controller 38 integrates or smooths the AFC speed control signal to prevent sudden extreme changes in motor speed which may be outside motor capacity. The controller 38 is coupled to a fire control circuit 40. See FIG. 4. A tachometer speed signal of the motor 12 is likewise coupled to the fire control circuit 40 which controls the firing of the SCR 18 to bring the motor 12 to the crossover speed.

The signal from comparator 32 is also coupled to the comparator 36 which generates a damper position control signal depending on whether the fan speed is above or below the crossover point. The comparators 34 and 36 are interlocked by an overlap so that the damper position control signal will only be generated when the fan speed is below the crossover point and so that the speed control signal from comparator 34 will remain at the crossover speed when actual fan speed is below the crossover point. The damper position control signal from comparator 36 is coupled through a rate controller 42 to the mechanism 13 for control of the dampers. Rate controller 42 integrates or smooths the damper position control signal to prevent sudden extreme changes in damper position which may overload the damper drive mechanism.

Switches are provided in the circuitry to facilitate manual operation as well as automatic operation. Also, switches are provided as shown at the top of FIG. 8 to facilitate modification of the speed control signal at a fast or slow rate in an increasing direction or decreasing direction and override all other signals. When a drive for a fan is started in the automatic mode from zero speed, it accelerates to minimum operating speed. If the flow demand is not satisfied but is calling for a decrease in speed, the AFC speed control signal stays at the minimum operating level. If the flow demand signal calls for greater flow, the damper position signal increases until the 100% open position for the damper is reached. Above that level, the damper position signal stays at the 100% level and the fan driven speed synchronizes with the flow demand signal 30.

MULTI FAN SYSTEM

If a particular flow control system involves a plurality of fans, comparator 34 must be capable of recognizing a demand signal which exceeds the rate of flow of a single fan and thereafter split the demand signal so as to bring a second fan into operation. When a second fan is brought into operation in parallel with the first fan, the logic system splits the demand signal equally so that the first fan has a rate of flow which is decreased until both fans operate at approximately the same rate of flow depending upon the pressure of the system downstream from the fans. When the first fan rate of flow is decreased, such decrease is attained as described above first by varying speed of the first fan to the crossover point B and thereafter varying damper positions.

SYSTEM UPSET

With the advent of large boiler systems, and the restictions imposed by pollution control standards, a typical boiler system is provided with an upstream forced draft fan and a downstream induced draft fan so that the boiler can operate with a balanced draft situation. A balanced draft situation can be upset for a variety of reasons such as an inadvertent opening of a breaker, a loss of fuel supply, and the like. If there is a boiler upset, the operating conditions can soon reach a situation which results in pressure of the system exceeding the structural strength of the system. When a boiler upset occurs, it is essential that air flow be adjusted rapidly.

In order to rapidly adjust air flow, the present invention is particularly suited for this problem in that air flow can be rapidly decreased from 100% to 70% merely by a speed change of the fan. In this regard, motor 12 is provided with a dynamic brake 22. The brake 22 is a small D-C excitation system to apply D-C amps to the winding of motor 12 to generate torque in a braking mode. Brake 22 will facilitate a decrease in 300 rpm in 15 seconds whereas a conventional centrifugal fan may take hours to accomplish a similar decrease in speed. In a fan designed with a maximum speed of 700 rpm, a decrease of 300 rpm is the equivalent of a decrease in 80% of the head.

The system of the present invention enables one to tailor the operating conditions so as to provide a limit line in a controlled manner as opposed to the stall line in a conventional axial fan which is uncontrolled.

Figure 9:
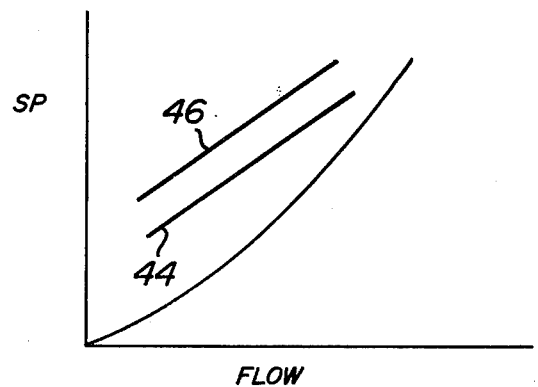
FIG. 9 is a diagrammatic graph for static pressure versus flow.

As shown in FIG. 9, there is schematically illustrated a graph of static pressure versus flow. Outside the operating line representing the expected spectrum of operation, there is provided a warning line 44 and an action line 46. Each of the lines 44, 46 is a limit line. The limit line for a centrifugal fan is an artificial limit replacing a real limit on an axial fan. On an axial fan, the stall line has been proposed as a means for preventing the development of excessive pressures which could exceed the structural integrity of the system resulting in damage that is referred to as an implosion. The condition of stall on an axial fan is unstable and can result in surges as well as mechanical damage.

In the system of the present invention, there is created a limit line whereby upset conditions which could lead to an implosion are monitored and corrective action initiated without causing unstable operation and with a response time equal to or better than that capable of being obtained on an axial fan.

The illustration in FIG. 9 is purely exemplary as to the location of the limit lines 44, 46. Thus, the lines 44, 46 could be horizontal. The only limitation is that they be above the operating curve for the fan. Fan speed and damper position are known factors. The pressure is a factor which is capable of being measured and will vary with the flow rate. The actual static pressure as measured may be below the limit line 44. If so, no action is taken. If the actual measured static pressure equals or exceeds that of the warning line 44, at any particular flow rate, a contact switch is closed or in some other manner a warning signal is generated to warn the operator. If the actual static pressure measured, at any particular flow rate, exceeds the action line 46, then another contact switch is closed or in some other manner a signal is generated to indicate to an operator the corrective action that is necessary to prevent an implosion. In the alternative, the action signal may automatically shut down the system.

Referring to FIG. 8, the signal from controller 32 is also communicated to calculator 48. Calculator 48 is programmed with the operational curve of the fan and determines what the maximum desired pressure should be at the particular flow rate being handled by the fan. The calculator 48 is coupled to a pressure comparator 50. The signal from calculator 48 is divided into a signal representative of actual measured pressure communicated thereto by comparator 52. If the resultant signal is equal to or greater than 0.9, for example, this indicates that the system is operating at or above the limit line 44 and the warning signal is generated. If the resultant signal is equal to or greater than 1, this indicates that the fan is operating at or above the limit line 46 and the action signal is generated.

The fan pressure signals of all parallel fans are compared with a set point pressure differential signal. See FIG. 8. The set point differential signal 53 is coupled to the differential comparator 54. The calculated and actual pressures for each of the fans are likewise coupled to the comparator 54. The comparator 54 ascertains the pressure differential between desired and actual for each fan and then compares that differential with the set point differential signal 53. When the set point differential signal 53 is equal or greater than 75% of the differential pressure for a particular fan, a warning signal is generated. If the set point differential signal 53 is equal to or greater than the differential pressure for a particular fan, an action signal is generated. In this manner, means is provided for detecting the fact that one fan of a fan system is acting improperly and corrective action may be taken whereby that particular fan is taken out of action or otherwise is adjusted by appropriate controls to bring it back into line with the other fans.

Figure 7A:
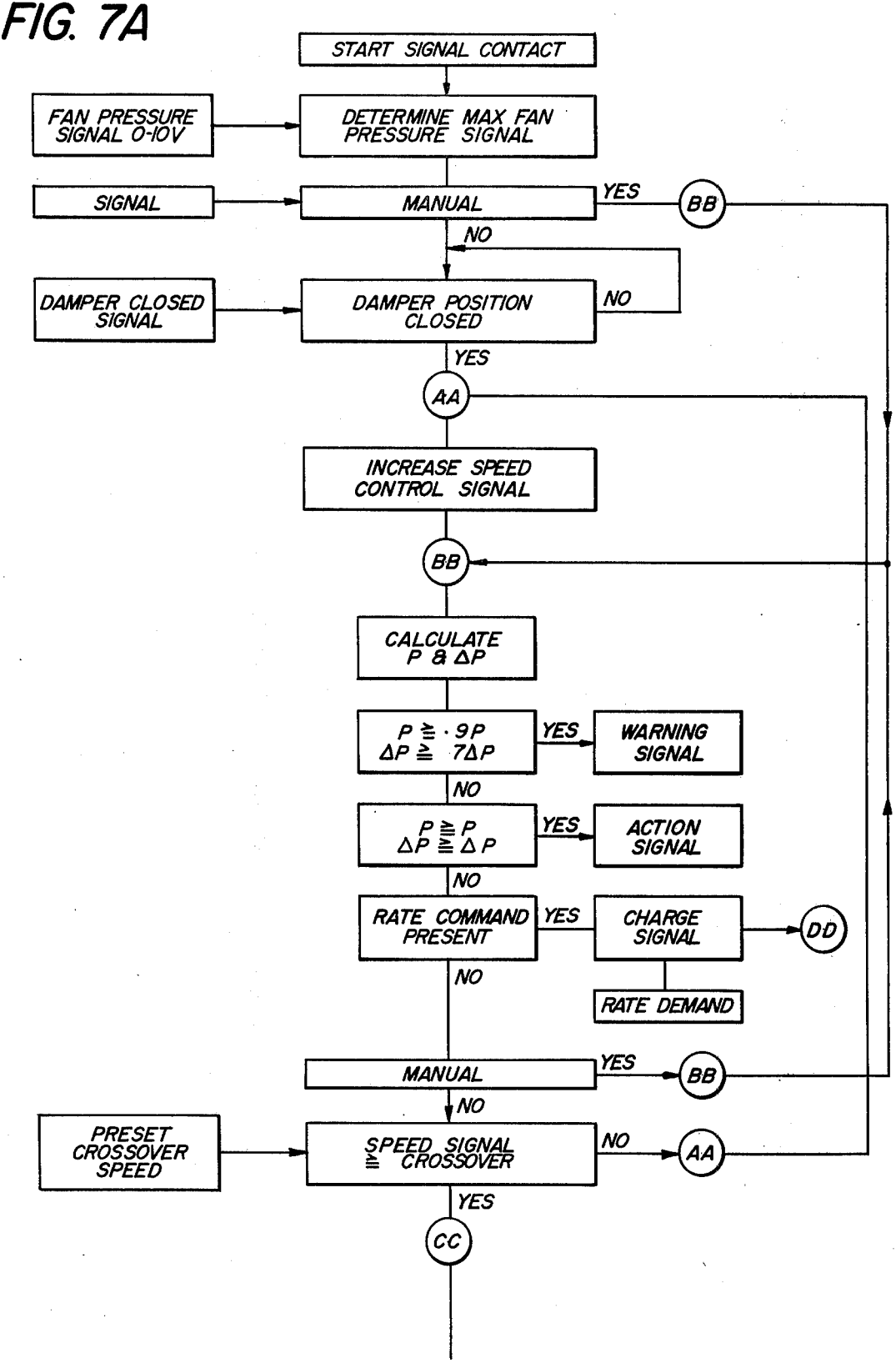
FIGS. 7A and 7B are block diagrams setting forth a sequence of steps when practicing the present invention.
Figure 7B:
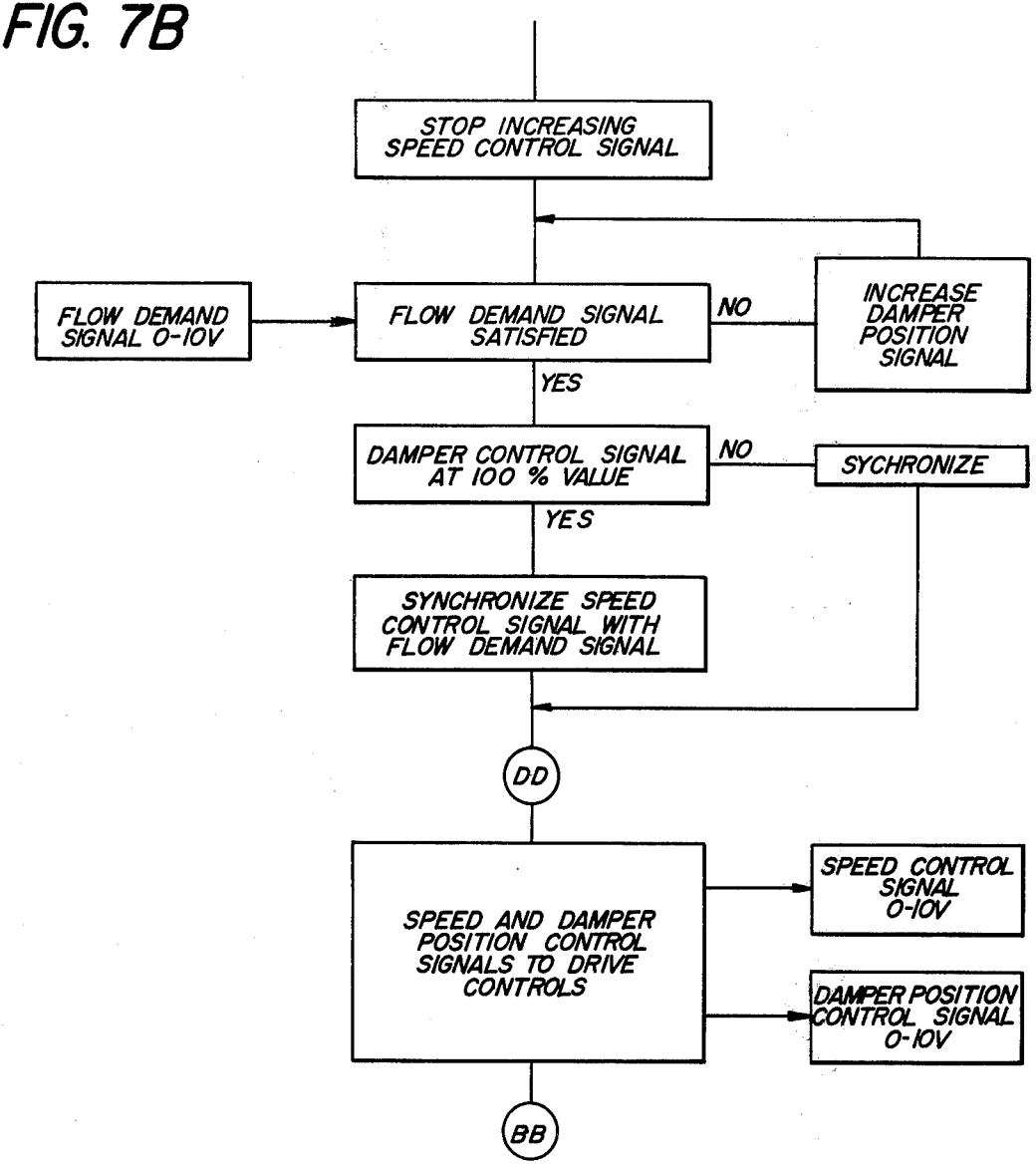

FIGS. 7A and 7B illustrate a block diagram of a sequence of steps which are followed when putting a fan on line. The operator will press a start signal contact. Each fan has a pressure signal. The pressure signals are compared to determine the maximum pressure signal. If the system is on manual operation, the sequence immediately jumps to position B. If the system is not on manual operation, the closed position of the dampers is detected and speed is increased.

Actual and desired pressures are determined and compared by comparator 50. Depending upon the ratio of the actual pressure to the desired pressure, no signal, or a warning signal, or an action signal may be generated as described above. Also, the pressure differential between fans of the system is compared by comparator 54 with a resultant no signal, or warning signal, or action signal as described above.

The speed control signal may be changed if there is a rate demand signal superimposed thereover. Various contacts are provided to facilitate a rate demand signal change, fast or slow, while increasing or decreasing. Suitable rate demand contacts would be provided for slow motor speed, fast motor speed, slow damper, fast damper, slow damper — slow motor speed, fast damper — fast motor speed, and fast damper — slow motor speed.

If the speed control signal is less than the crossover speed point or range, the sequence reverts to point A. If the speed control signal is equal to or greater than the crossover speed, the next step in the sequence is to stop increasing the speed control signal. If the flow demand signal 30 is not satisfied, controller 36 opens the dampers wider. If the flow demand signal is satisfied, and the damper position is at 100%, then fan speed increases so that the speed control signal is synchronized with the flow demand signal 30. If the damper control signal is not at 100% value, it is adjusted to attain the 100% value. Thereafter, the speed control and the damper control signal continue to drive the controls to maintain the system in balance as described above.

Thus, it will be seen that the centrifugal fan system of the present invention provides for load management, paralleling of fans in a system, as well as system upset controls.

Various elements identified in FIG. 8 of the drawing are commercially available devices and preferably are the devices set forth hereinafter which are available from the General Electric Company as part of their "Directomatic II" system. Elements 32, 38, 42, the speed fast rate control, the speed slow rate control, the damper position fast rate control, and the damper position slow rate control are principally time accelerating (rate) function generators sold as GE Model IC 3600-AFGH. Elements 34 and 36 are primarily an amplifier such as GE Model IC 3600-AOAL. Element 52 is preferably a gate expander such as GE Model IC 3600-LLXA. Element 50 is preferably a divider circuit such as GE Model IC 3600-AAMA. Element 54 is preferably an amplifier such as GE Model IC 3600-AOAL with a voltage sensitive relay circuit such as Model IC 3600-AVFA.

The present invention may be embodied in other specific forms without departing from the spirit or essential attributes thereof and, accordingly, reference should be made to the appended claims, rather than to the foregoing specification as indicating the scope of the invention.

I claim:

1. A method of controlling operation of a centrifugal fan comprising:
   (a) providing a centrifugal fan with a means whereby upset conditions in a system receiving air from said fan can be monitored and correction action initiated,
   (b) providing an artificial pressure limit curve above the operation curve representing the expected spectrum of normal fan operation,
   (c) monitoring the operation of the centrifugal fan by measuring its actual output pressure at the then existing flow rate and generating a first signal, determining the existing flow rate and the desired pressure for the fan at the existing flow rate, generating a second signal representing said desired pressure,
   (d) comparing said first and second signals,
   (e) generating a third signal when as a result of said comparison the actual fan pressure signal exceeds the desired pressure signal at the then existing flow rate by a predetermined amount and is at least equal to a point on said limit curve.

2. A method in accordance with claim 1 wherein said monitoring step also includes generating a signal indicative of the differential between desired and actual pressure on a plurality of centrifugal fans in parallel, providing a set point differential pressure signal, comparing the differential pressure signal of each fan with the set point differential signal and as a result thereof generating a warning or action signal when the differential between the compared signals is above a predetermined point.

3. A method in accordance with claim 1 including providing first and second pressure limit lines, producing a warning by said third signal when the actual fan pressure exceeds the first line, and producing an action signal by said third signal when actual fan pressure exceeds the second line.

4. A method in accordance with claim 1 wherein steps of generating pressure signals includes converting them into voltage signals.

5. A method of controlling operation of a fan comprising:
   (a) providing a fan with a means whereby boiler system upset conditions can be monitored and correction action initiated,
   (b) driving the impeller of said fan by a motor having a speed control circuit for converting slip losses into primary power,
   (c) controlling the air flow from said fan by only changing the velocity of the fan impeller when flow is above a predetermined crossover speed in response to a flow demand signal from the system,
   (d) providing a flow control device in the form of vanes or dampers upstream of said fan with an operative range of adjustment so that the device is fully open at said crossover speed, and adjusting said device in response to said flow demand signal when the fan is operating at a speed below the crossover speed,
   (e) controlling air flow from said fan at points below said crossover speed only by changing the position of said flow control device,
   (f) monitoring the operation of the fan as to pressure and flow including generating a first signal indicative of actual fan pressure and a second signal indicative of desired fan pressure at the then existing flow rate, comparing said pressure signals and generating a third signal when as a result of said comparison the actual fan pressure exceeds the desired pressure by a predetermined amount, providing a pressure limit line above the operative curve for pressure versus flow rate, and generating said third signal when actual pressure is at least equal to a point on said limit line at the existing flow rate.

6. A method in accordance control claim 5 wherein said monitoring step also includes generating a signal indicative of the differential between desired and actual pressure on a plurality of fans in parallel, providing a set point differential pressure signal, comparing the differential pressure signal of each fan with the set point differential signal and as a result thereof generating a warning or action signal when the differential between the compared signals is above a predetermined point.

7. A method in accordance with claim 5 including using a controller interfaced between the flow demand controls of the apparatus receiving air from said fan and said motor circuit whereby steps (c) and (d) are automatically performed in response to the flow demand signal from said controller.

* * * * *